D. E. BARTON.
BLANKET FASTENER.
APPLICATION FILED APR. 12, 1906.
1,042,753.
Patented Oct. 29, 1912.
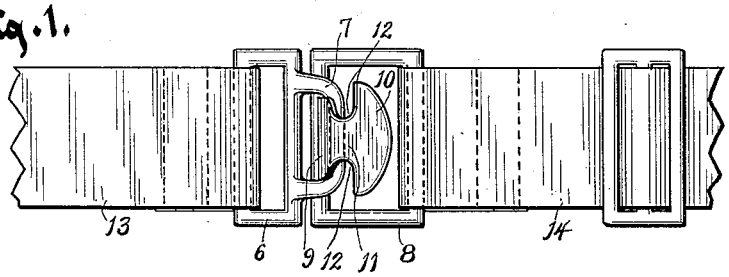
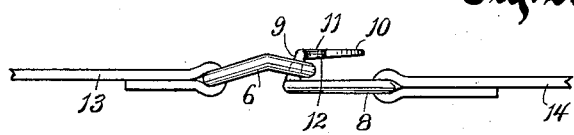
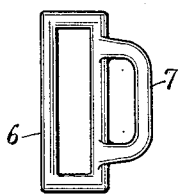
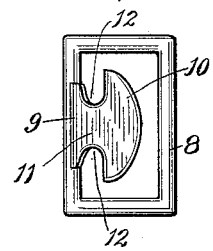
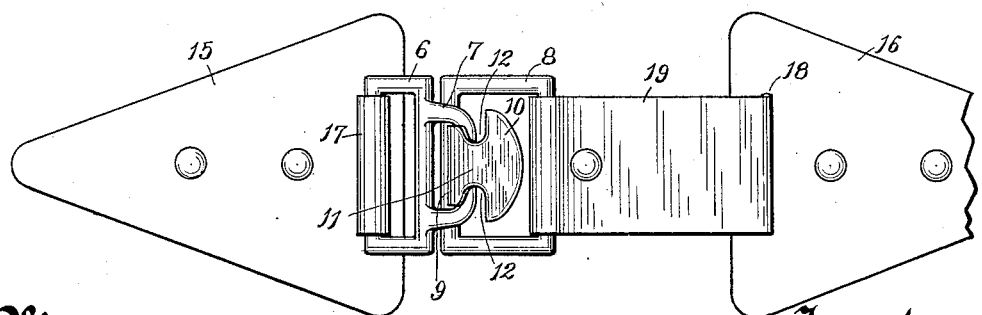
Witnesses.
O. H. Keeney,
Anna F. Schmidtbauer
Inventor.
Delbert E. Barton
By Benedict, Morsell & Caldwell
Attorneys.
COLUMBIA PLANOGRAPH CO., WASHINGTON, D. C.

UNITED STATES PATENT OFFICE.

DELBERT E. BARTON, OF RACINE, WISCONSIN, ASSIGNOR TO GUSTAVE C. RASCH, OF BURLINGTON, WISCONSIN.

BLANKET-FASTENER.

1,042,753.   Specification of Letters Patent.   Patented Oct. 29, 1912.

Application filed April 12, 1906. Serial No. 311,276.

*To all whom it may concern:*

Be it known that I, DELBERT E. BARTON, residing in Racine, in the county of Racine and State of Wisconsin, have invented new and useful Improvements in Blanket-Fasteners, of which the following is a description, reference being had to the accompanying drawings, which are a part of this specification.

My invention has relation to improvements in blanket fasteners.

It is the primary object of the invention to provide not only an exceedingly simple fastener, but one which at the same time shall possess the maximum degree of security against the two members thereof becoming accidentally separated or unfastened.

With the above primary object, and other incidental objects, in view, the invention consists of the devices and parts, or the equivalents thereof, as hereinafter more fully set forth.

In the accompanying drawings, Figure 1 is a plan view of the device, showing the two members thereof connected respectively to flexible tapes or straps; Fig. 2 is an edge view of Fig. 1; Fig. 3 is a detail view of one member of the fastener; Fig. 4 is a detail view of the other member of the fastener; and Fig. 5 is a plan view showing a modified form of the devices to which the fastener members are attached.

Referring to one of the members of the fastener, the main portion 6 thereof is in the form of a loop, preferably of rectangular shape, and having extending from the forward bar thereof a projection 7 having a slot therein of limited width, the longitudinal axis of said slot being in a plane at right angles to the line of strain or pull on the two members of the fastener, the said projection preferably curved or bent downwardly slightly. The other member of the fastener is composed of a main loop portion 8, also preferably of rectangular form, and somewhat wider than the loop 6. Extending from a point of the forward bar of the loop 8, between the ends of said bar is a backwardly-turned hook member. The lower portion or base 9 of this hook member extends upwardly for a short distance at substantially a right angle to the forward bar of loop 8, but preferably at a slight rearward incline. The hook is then bent in a substantially horizontal plane rearwardly to form a horizontal terminal end or head 10, the said head being connected to the base portion by means of a narrower neck portion 11, forming oppositely disposed side edge recesses 12. The rear edge of the head 10 is preferably curved in the arc of a circle, as shown in the drawing, although this is not absolutely essential.

It will be understood that the distance from the inner edge of a recess 12 on one side of the head 10 to the extremity of said head on the opposite side thereof is less than the length of the longitudinal axis of the slot of the projection 7. Therefore, in order to accomplish the disconnecting of one member from the other, it is first necessary to swing one of the members in a direction at right angles to the plane of the other member. In other words, assuming that the parts are in the position shown in the drawing, it is necessary to swing one of the members upwardly with respect to the other member. An endwise movement is next given to one of the members with respect to the other so as to bring one of the end bars of the slotted projection 7 into one of the recesses 12. The final step is to swing one of the members around in a direction at right angles to the first swinging movement referred to, and which of course has the effect of disconnecting the two members. In consequence of my improved construction, when the two members are engaged and under tension there is no danger of accidental disengagement, and particularly is this true in view of the fact that the length of the base portion 9 of the hook is sufficient to fill up the length of the slot. It is obvious that if said base portion were of such limited length as not to fill up the length of the slot, the two members of the fastener, even when under tension, might drop and become accidentally detached. It is also evident, in view of the length of said base portion being sufficient to fill up the length of the slot, that the ends of said base portion form shoulders which bear against the ends of the slot when the two members are connected, and consequently lateral play of the two members is prevented. Also, by reason of the limited width of the slot, very slight longitudinal movement of one of the members with relation to the other is possible.

Looped around and connected to the outer bar of loop 6 is a flexible tape or strap 13, and a similar strap 14 is connected, in a like manner to the outer bar of loop 8. These flexible tapes or straps are secured to the blanket, in the usual way.

In Fig. 5 of the drawing instead of employing the two tapes 13 and 14 as shown in Figs. 1 and 2, I employ the substantially triangularly shaped pieces 15 and 16, which are secured to the blanket. The outer bar of loop 6 engages and is turnable in a loop 17 on the upper side of the triangular piece 15. The triangular piece 16 is provided with a slot 18, through which a flexible tape or strap 19 is passed, the said strap at its forward end engaging around the outer bar of the loop 8.

From the foregoing description, it will be seen that my invention provides a most simple and effective fastener for blankets, wherein the danger of the members of the fastener becoming accidentally uncoupled is reduced to the minimum.

In coupling the two members together, in view of the fact that the longitudinal axis of the head 10 is slightly greater than the longitudinal axis of the slot of the projection 7, it is necessary that the head 10 be first passed through the said slot of the projection 7 from the under side, and in an inclined direction until one of the recesses 12 meets the adjacent end bar of projection 7 when of course room is afforded for the opposite end of the head 10 to clear the opposite end bar of projection 7, at which time the two members are in position to be brought into alinement with each other, and the transverse connecting bar of projection 7 will drop in position adjacent to the inner face of the base 9 of the hook. When the two members of the fastener are thus coupled together, the strain exerted by the tapes is of course in a straight line, and this brings the bearing of the transverse bar of projection 7 directly against the inner face of base 9, which base has sufficient length to take the full bearing of projection 7, and is also thickened to a slightly greater extent than the other portions of the hook, in order to withstand the strain. Of course when the members of the fastener are thus in engagement, it is extremely difficult for said members to accidentally uncouple, in view of the fact that the strain is in a direct line. When it is desired to effect the uncoupling of the two members, this is accomplished in the manner hereinbefore fully pointed out.

In the form of fasteners for blankets as now used, ordinary snap hooks are connected to the flexible tapes. It is believed that my improved construction possesses decided advantages over the old snap hook form of fasteners in view of the desirable ends accomplished by my particular construction, as hereinbefore fully pointed out.

While I have herein described my invention as a fastener particularly adapted for blankets, yet I do not wish to be understood as restricting myself to this particular adaptation, but desire to cover the fastener for any use for which it may be found desirable. It will also be observed that the invention generically stated comprises a member having an elongated transverse slot or opening, and a member provided with a hook having a nose of greater width and less length than the length of the slot or opening in the other member and a shank or base approximately equal in width to the length of said slot or opening, so that to uncouple the two members one member must be brought into position at an angle to the other member to permit the slotted member to free the shank or base of the hook member and one member to be then twisted or turned sidewise to disengage the two members.

What I claim as my invention is:

1. A fastener for blankets and the like, comprising a member having an elongated transverse slot or opening and a member provided with a hook having a nose of greater width and less length than the length of said slot or opening and a shank or base approximately equal in width to the length of said slot or opening and coacting with the walls of said slot to prevent disengagement of the two members until one member is brought into position at an angle to the plane of the other and then turned sidewise in relation to the other.

2. In a fastening, the combination of two members, one having a transverse slot and the other a hook with a notch in one edge around the bend, the shank of the hook being of approximately the same width as the length of the slot and the nose of the hook being of greater width adjacent and outside the notch and of somewhat less length outside the notch than the length of said slot.

3. A fastener for blankets and the like, comprising a member having a projection extending from one side thereof, said projection provided with a slot, the said slot being of limited width, and another member having a hook projecting from one side thereof and adapted to engage the slot, the lower portion of said hook projecting upwardly for a slight distance to form a base of a length to fill the length of the slot, and the said hook turned rearwardly in a substantially horizontal plane and terminating in an enlarged end or head, whose ends extend beyond the ends of the slot, the horizontal portion of the hook just back of the enlarged end or head having its side edges provided, respectively, with oppositely disposed recesses, the distance from the inner edge of each recess to the extremity of the opposite end of the enlarged head being less than the length of the slot of the slotted projection, and the limited width of the slot being such as to permit only a comparatively limited longitudinal movement of the hook and slotted projection with respect to each other.

In testimony whereof, I affix my signature, in presence of two witnesses.

DELBERT E. BARTON.

Witnesses:
  A. L. MORSELL,
  ANNA F. SCHMIDTBAUER.

Copies of this patent may be obtained for five cents each, by addressing the "Commissioner of Patents, Washington, D. C."